March 31, 1959     R. C. PAULSEN     2,880,392
DIGITAL MICROVOLT MEASURING DEVICE
Filed Nov. 30, 1953     5 Sheets-Sheet 1

INVENTOR.
ROBERT C. PAULSEN
BY
Campbell, Brumbaugh, *illegible*
HIS ATTORNEYS.

March 31, 1959

R. C. PAULSEN 2,880,392

DIGITAL MICROVOLT MEASURING DEVICE

Filed Nov. 30, 1953

INVENTOR.
ROBERT C. PAULSEN
BY
Campbell, Brumbaugh
Free & Graves
HIS ATTORNEYS.

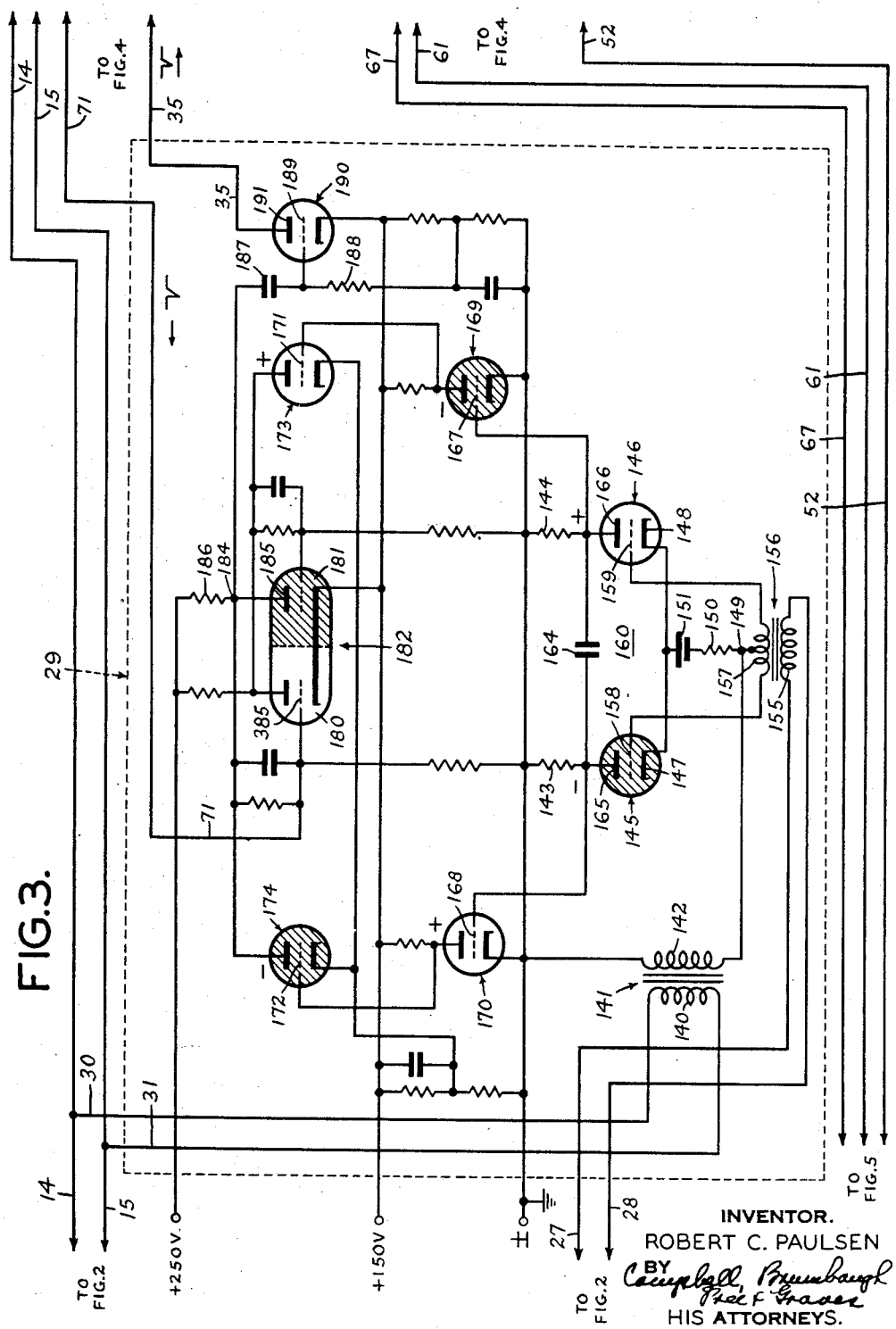

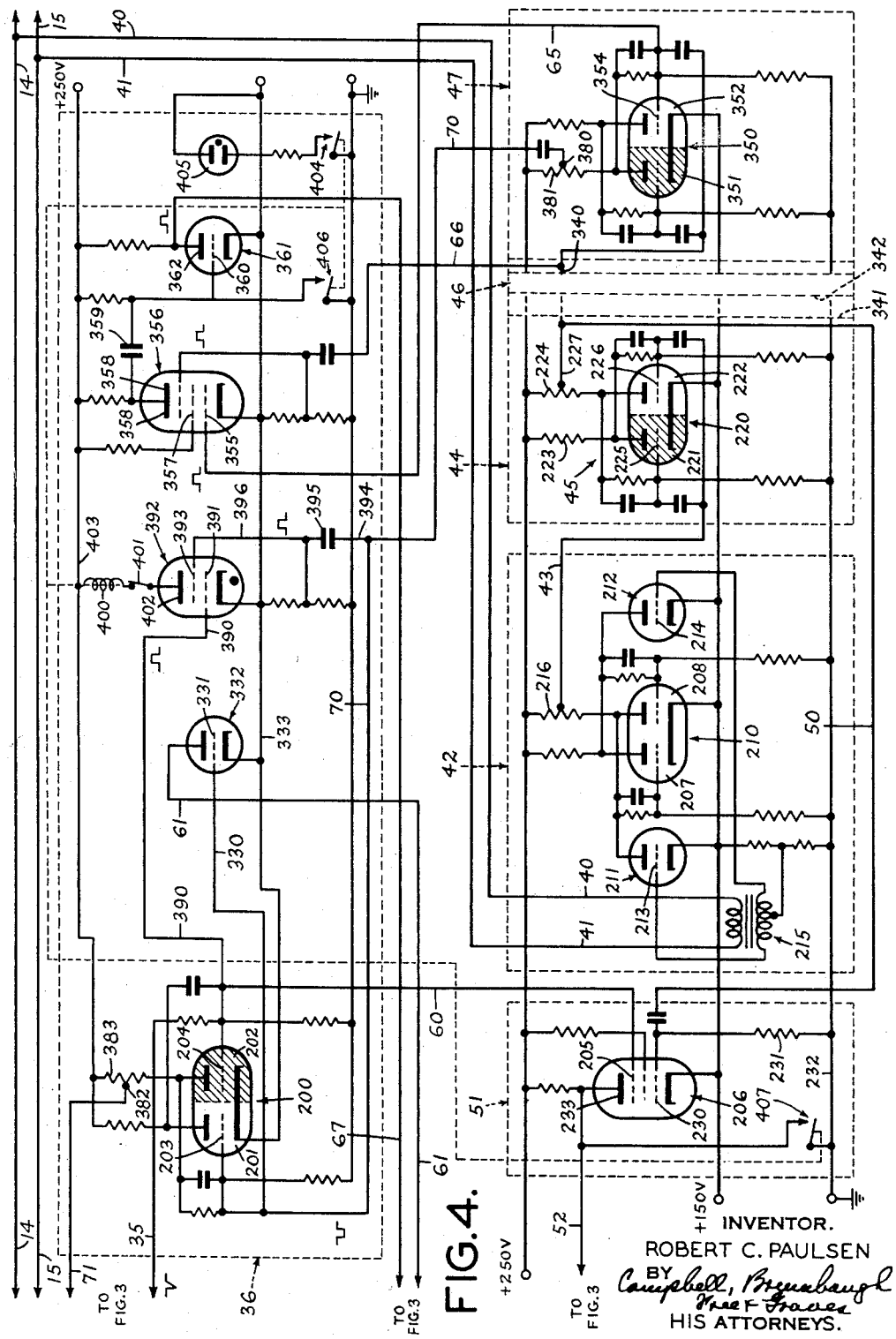

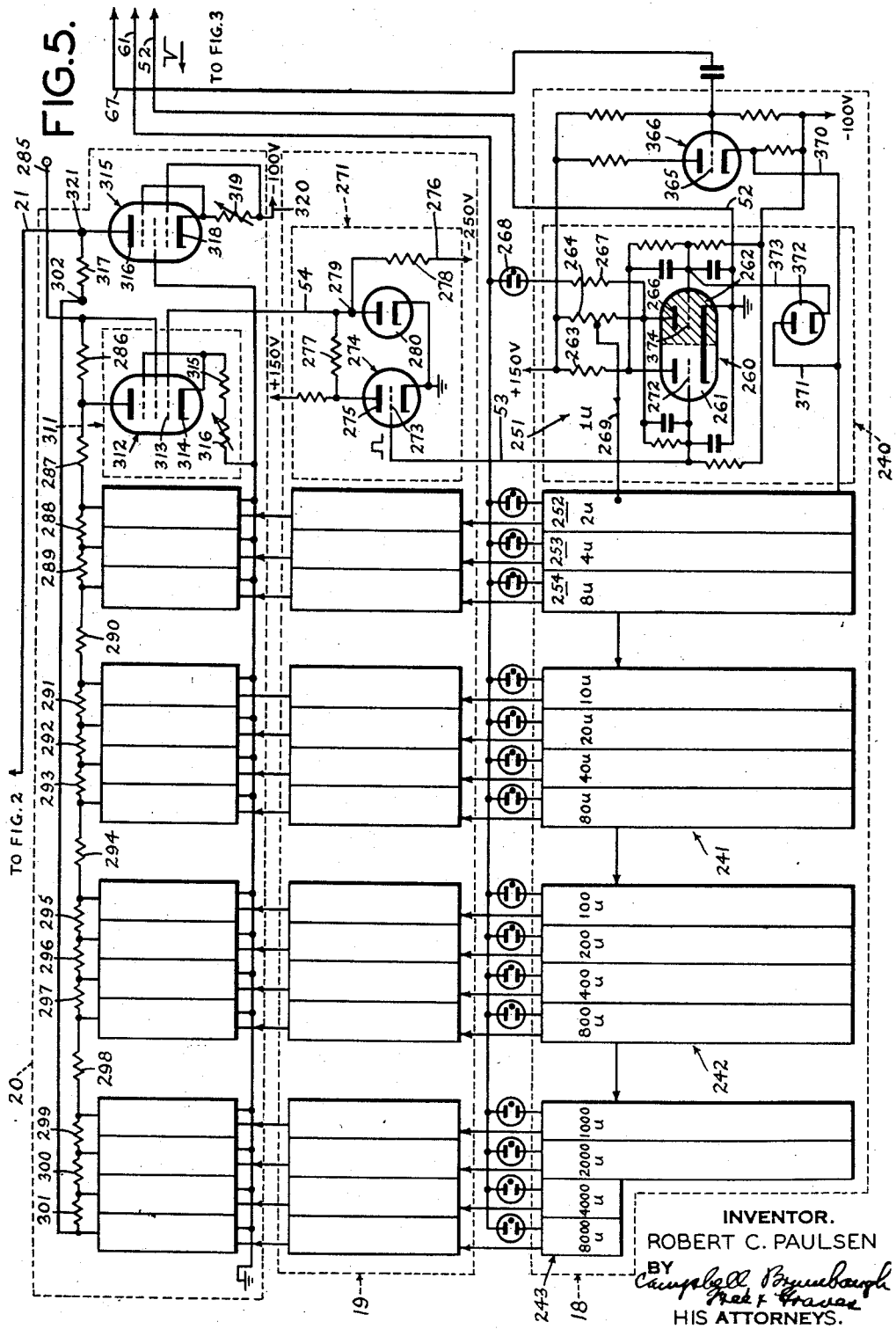

United States Patent Office 2,880,392
Patented Mar. 31, 1959

2,880,392

DIGITAL MICROVOLT MEASURING DEVICE

Robert C. Paulsen, Boonton, N.J., assignor to International Business Machines Corporation, New York, N.Y., a corporation of New York Application November 30, 1953, Serial No. 395,138

8 Claims. (Cl. 324—99)

This invention relates to measuring systems, and more particularly to an improved system for measuring the value of a variable quantity such as an electrical potential or a physical displacement.

A principal object of the present invention is to provide a measuring system furnishing digital manifestation of a variable quantity with a high degree of linearity, sensitivity, accuracy and reproducibility independent of variations in the operating parameters of the referred to system.

A further object of the invention is to provide a system of the above-noted character capable of measuring and manifesting the value of a variable quantity represented as an electrical energy characteristic with a small order of magnitude.

A still further object of the present invention is to provide in a measuring system the feature of positive timing for the separate stages of operation occurring in a measuring cycle.

Another object of the present invention is to provide in a measuring system the feature of introduction of a measuring factor enabling the true measurement to be manifested directly.

Still another object of the present invention is to provide in a measuring system an automatic shut-down feature when the variable quantity measured exceeds a predetermined value.

In accordance with the present invention, there is provided a variable quantity measuring and manifesting device which comprises the combination of a plurality of structural elements. These elements include a register adapted from its initial setting at the beginning of a measuring cycle to progressively change in registry. Translator means are provided which are adapted for developing a progressively changing quantity of a value commensurate with the progressively changing registry of the register. A comparer-modifier means is provided for comparing in opposing relation this changing quantity with the variable quantity to be measured and for converting the difference value thereby obtained into a signal having an alternating component of one and another time characteristic, respectively, before and after a traversal of a null in the difference between the two quantities. Discriminator means are provided for arresting the progressive change in registry of the register in response to a change in time characteristic of the alternating component. Means are also provided for manifesting or indicating the registry reached by the register before the progressive change in registry is arrested.

In accordance with an important feature of the present invention timer means is driven in synchronism with the rate of registration by the register. A characteristic signal output from this timer means is utilized to provide for changes in the nature of the operation performed by the measuring system.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Figure 2 is a diagram in schematic form of the comparer-modifier unit and the amplifier-filter unit of Fig. 1;

Figure 3 is a schematic circuit diagram of the discriminator of Fig. 1;

Figure 4 is a schematic circuit diagram of the control circuits, gate, pulse generator, and timer of Figure 1; and Figure 5 is a schematic circuit diagram of the register, buffer amplifier array, and translator of Fig. 1, blocks being used to represent certain of the duplicate elements to avoid unnecessary complexity.

Figure 1:
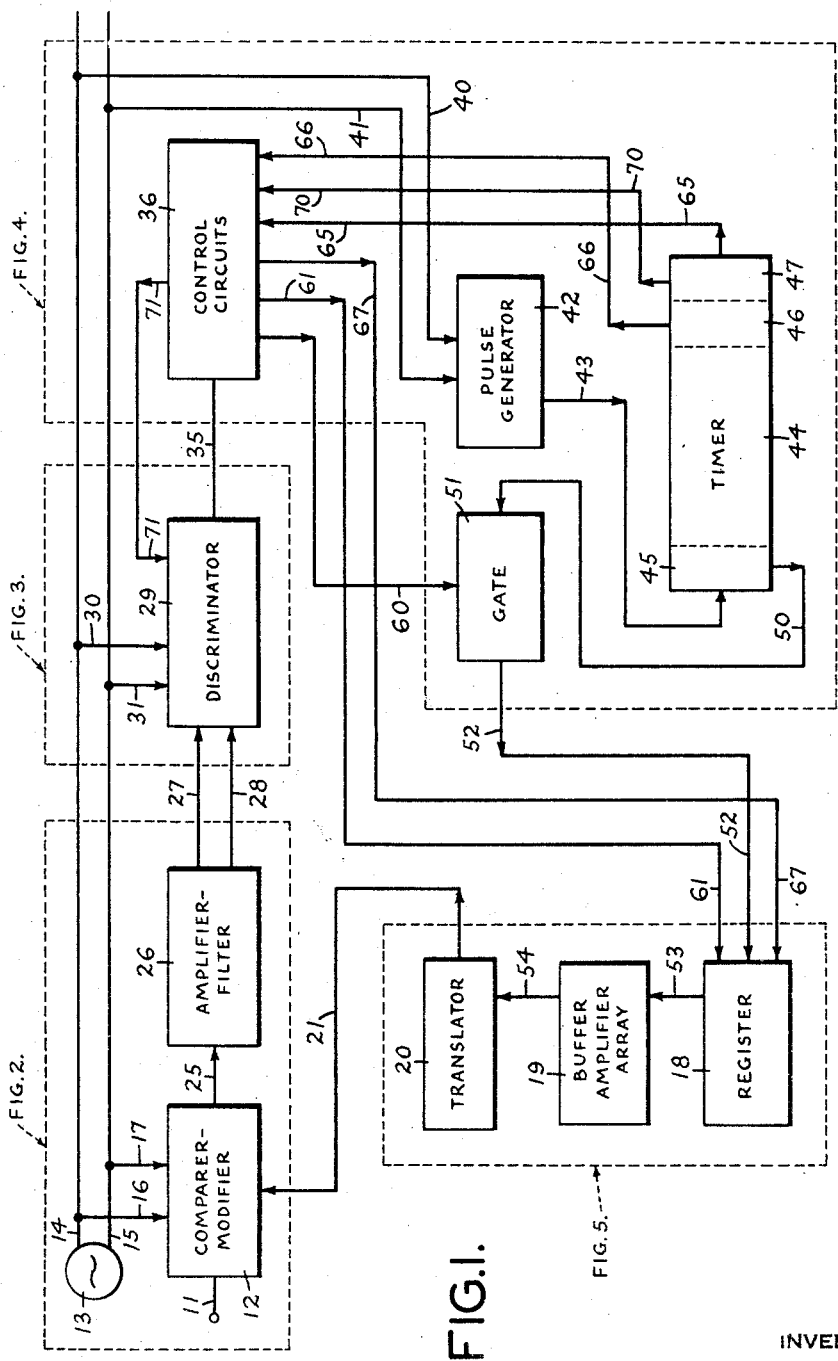
Figure 1 is a block diagram of a measuring system in accordance with the present invention.

It will be understood that in the drawings shaded interiors of electron tubes or tube sections designate that the shaded tube or tube section either is conducting at the start of a measuring cycle and is later non-conducting, or that it is more conducting at the start of a measuring cycle than at a later time. It will also be understood that when wave forms are shown associated with electrical leads on the drawings, the wave form shown represents the significant signal upon the lead.

*The system as a whole*

Referring now to Figure 1, a sensing instrument (not shown) as, say, a strain gauge or thermocouple develops as its data output an electrical quantity, as for example, potential, representing the data in non-digital form. This potential which may be of a small order of magnitude, as, say, microvolts, is supplied by a lead 11 to a comparer-modifier 12. A second input for the comparer-modifier 12 is furnished by an alternating signal source 13 by way of distributing conduits 14, 15 and leads 16, 17. A third input is supplied to the comparer-modifier unit in the form of a changing measuring potential of a small order of magnitude developed by the sub-system of a register 18, buffer amplifier array 19, and translator 20, the measuring potential being fed by a lead 21 to the comparer-modifier 12. The comparer-modifier 12 is adapted to compare in opposed relation the two potential inputs thereto.

In magnitude characteristic the measuring potential at the start of a measuring cycle has a value of one in terms of the module or unit of measure to be employed. For example, where the module is microvolts, the measuring potential initially has a value of one microvolt. Thereafter, as the measuring cycle continues, the measuring potential, by means later described, progressively increases by increments of unit value to traverse a null in the difference between the measuring potential and the potential to be measured.

Comparer-modifier 12 responsive to its three inputs provides a signal having an alternating component with one and another time characteristic when respectively the measuring potential is less than or greater than the unknown voltage, the phrase "time characteristic" being employed to mean a time property of an alternating signal, such as, preferably, phase, which in contrast to amplitude, is relatively unaffected by variation in circuit operating parameters such as gain factor. This alternating output signal is supplied via lead 25 to an amplifier-filter 26 where the signal is amplified and filtered to eliminate harmonics while passing the mentioned alternating component. Thereafter, the filtered signal is supplied by leads 27, 28 to a discriminator 29 receiving as an additional input an alternating signal from source 13 by way of conduits 14, 15 and branch leads 30, 31. Conveniently, source 13 may be considered to provide an alternating signal for a first channel including comparer-modifier 12 and an alternating signal for a second channel formed by conduits 14, 15 and leads 30, 31, the discriminator 29 receiving inputs from both channels.

In discriminator 29 the phase of the alternating signal from leads 27, 28 is compared with the phase of the signal derived from leads 30, 31. So long as both signals are unchanged in relative phase, the discriminator 29 remains inactive. When, however, the measuring potential on lead 21 by its progressive increase traverses a null in difference with the unknown voltage on lead 11 to exceed the same in magnitude, a phase reversal will be manifested by the first-named signal input to the discriminator unit, this reversal causing a change in the phase relation between the two discriminator inputs. In response to this change in phase relation, discriminator unit 29 provides a trigger signal which is supplied via lead 35 to the control circuits unit 36, the effect of this trigger signal being described hereinafter.

Alternating signal source 13, in addition to supplying comparer-modifier 12 and discriminator 29 with alternating energy, also supplies, via distribution conduits 14, 15, and leads 40, 41, a portion of its alternating energy to a pulse generator 42 which develops one negative pulse for each cycle of the alternating input signal thereto. These negative pulses are supplied by a lead 43 to a timer 44 which, preferably, is a pulse counter comprised of a chain of "on-off" stages so coupled together that each stage changes its state once for each two changes in state of the previous stage in the chain. In the present instance, a twelve-stage pulse counter is utilized. If the input pulses to timer 44 have a repetition frequency "$f$," the first stage 45 of timer 44 will cycle as to its change of state at the rate of $f/2$, the second stage (not shown) will cycle at the rate $f/4$, and so on, the eleventh and twelfth stages 46 and 47 respectively cycling at the rates of $f/2048$ and $f/4096$.

The $f/2$ stage 45 in its cyclical operation produces one output pulse for each two input pulses on lead 43. These output pulses are supplied by a lead 50 to a gate 51. At the start of a measuring cycle, gate 51 is open to permit passage of the received pulses through the gate and, via a lead 52, to the input of register 18 which preferably is a pulse counter manifesting decimal digits by binary signal groups. Register 18 from a zero registry setting at the start of a measuring cycle increases its registry setting by one, responsive to each pulse received thereby, the register thus progressively manifesting the accumulated total count of the input pulses so far received. Each registry condition is imparted by connections such as lead 53 to the buffer amplifier array 19. Buffer amplifier array 19, in turn, responsive to the received registry data, through connections such as lead 54 operates the translator unit 20 so that for each increase of one in the registry a corresponding increase of one unit is added to the measuring potential developed by translator 20.

It will be recalled that the initial value of the measuring potential is one unit. Thus, at any time while the count on register 18 is increasing, the measuring potential in terms of the units of measure employed has a magnitude value which numerically is greater by one than the total count manifested by register 18.

The measuring potential progressively increases until the next unit added changes the measuring potential in magnitude from less than (or equal) to greater than the unknown potential input to comparer-modifier 12, the effect being a traversal of the null in the difference between the two potentials. Alternatively, the mentioned effect amounts to a change in sense in the difference between the potentials.

Upon null traversal, discriminator 29 furnishes, as described, a trigger pulse via lead 35 to control circuit unit 36. Responsive to this trigger pulse, control circuits unit 36 provides a drop in voltage level which is communicated via lead 60 to gate 51 to close the gate for pulses passing therethrough to register 18. In consequence, the setting of the register remains static at the value thereof occasioned by the last-received pulse, the increase in measuring potential being concurrently halted.

Since the magnitude of the measuring potential in the units of measure employed is numerically one greater than the setting of the register, and since the register setting is rendered static when the measuring potential exceeds the unknown potential by one or less than one unit, it will be recognized that the static registry, numerically, represents substantially the exact value in the employed units of measure of the unknown potential input to comparer-modifier 12. Thus, if the module used is microvolts, the static registry represents the value of the unknown potential in microvolts.

Concurrently with closing gate 51, control circuits unit 36 provides over lead 61 a signal which activates indicating means (not shown in Fig. 1) associated with register 18 to provide an overt manifestation of the static setting of the register. Thus, the numerical value of the unknown potential may be observed.

Meanwhile, pulse generator 42 responsive to a continuing input from alternating source 13 continues to drive the various stages of timer 44. Timer 44 as a whole undergoes a full cycle when the last or $f/4096$ stage 47 undergoes a full cycle from, say, an "off" condition to "on" and back to "off" again. Thus, a full cycle for timer unit 44 corresponds with 4096 input pulses from pulse generator 42.

At 2048 pulses the $f/4096$ stage changes state to provide an increased voltage level for the remainder of the cycle upon lead 65 going to control circuits unit 36. At the three-quarter mark for the cycle the $f/2048$ stage 46 provides a signal upon lead 66 also going to control circuits unit 36. Responsive to the coincidence of signals borne by leads 65 and 66, control circuits unit 36 provides an output signal which via lead 67 is supplied to register 18 to reset the register to its zero setting, the overtly manifested value for the measured potential thus being erased.

When in a measuring cycle 4096 pulses have been received by timer unit 44, the $f/4096$ stage 47 changes state to thereby provide over lead 70 a signal to control circuits unit 36. Responsive to this signal, control circuits unit 36 over lead 71 provides a restoring pulse to discriminator 29 to resensitize this unit for the next measuring cycle. Concurrently, control circuits unit 36 increases the voltage level on lead 60 to thereby reopen gate 51 for pulses passing therethrough to register 18. Thus, the system as a whole, being returned to the conditions characterizing the start of a new measuring cycle, automatically initiates such new cycle to remeasure in the manner heretofore described, the unknown potential on lead 11.

The presently disclosed measuring system embodiment is adapted to measure potentials which in magnitude do not substantially exceed, say, a thousand units of the module employed or, in other words, 1000 microvolts. This figure, 1000, approximates 1024, the figure representing the number of pulses which register 18 at most can receive from $f/2$ stage 45 during 2048 input pulses thereto, or in other words, during half a measuring cycle. Advantage is taken of this approximation to shut down the system if the potential measured exceeds to any extent the prescribed upper measuring limit for the system.

As stated, half way in the measuring cycle, $f/4096$ stage 47 produces a characteristic signal on lead 65. Also, at this half-way mark, if the unknown potential on lead 11 exceeds 1024 units, no trigger signal from discriminator unit 29 will yet have been supplied by lead 35 to control circuits unit 36. At the half-way mark, accordingly, control circuits unit 36 in response to the coincidence of the signal on lead 65 and to the absence of a trigger on lead 35 will operate to actuate means (not shown in Fig. 1) which cut off the flow of input pulses to register 18 and also reset register 18. Under these circumstances, moreover, control circuits unit 36 operates a device indicating that the unknown potential applied to the system is of excessive magnitude. Thus, there is avoided an abnormal operation of the system which might otherwise result from measuring potentials with overly large magnitudes.

*Comparer-modifier and amplifier-filter units*

Referring now to Fig. 2, the comparer-modifier 12 receives (as an input on lead 11) the unknown potential to be measured and (as an input on lead 21) the measuring potential, both potentials being taken with respect to ground. Moreover, comparer-modifier 12 receives as an input on leads 16, 17 an alternating signal from source 13 of a frequency, for example, of 2000 c.p.s.

Considering the detailed circuit organization of comparer-modifier 12, lead 11 is coupled to the movable contact 100 of a synchronous single-pole, double-throw switch 101, the fixed contacts 102, 103 of which are coupled to opposite terminals 104, 105 of an impedance which is, preferably, the primary winding 106 of a transformer 107 having a secondary winding 108. Lead 21 is connected to the grid 109 of a triode 110 connected as a cathode follower the cathode 111 of which is connected to a center tap 112 of transformer primary 106. The movable contact 100 of switch 101 takes the form of a reed driven in vibration between fixed contacts 102 and 103 by a mechanical coupling with a conventional vibrator 113 excited by the alternating signal on leads 16, 17.

At any time the potential at center tap 112 is that of the measuring potential supplied by lead 21. Concurrently movable contact 100 is driven by vibrator 113 to mechanically oscillate in fixed phase relation with the phase of the alternating signal exciting the vibrator. By this mechanical oscillation the unknown potential on lead 11 will be supplied first to one and then to the other of terminals 104, 105 for primary winding 106. Current thus flows in the primary winding alternately in one and then the other of two paths between center tap 112 and, respectively, terminals 104 and 105. This alternation between paths of the current flow in primary 106 induces in secondary 108 a signal having an alternating component of the same frequency as the alternating signal from source 13.

The magnitude and direction of current in the primary winding paths depends upon the difference in magnitude between the measuring potential at the center tap 112 and the potential to be measured at terminals 104, 105. So long as the measuring potential is less than the measured potential, current is directed from the terminals towards the center tap with the result that the alternating signal component induced in secondary winding 108 may be considered to have a reference phase relation with the alternating signal which excites vibrator 113. As, however, the measuring potential at center tap 112 progressively increases in the manner described, a value is reached where the center tap voltage is within one unit of or equals the unknown voltage applied to the terminals. Following this condition, the measuring potential at the center tap when the next unit is added thereto, exceeds, as described, the measured potential at the terminals to cause current flow in primary 106 away from center tap 112 and towards terminals 104, 105. This reversal of current direction reverses the phase of the alternating signal component induced in secondary 108, the component thus assuming, as compared to its past condition, an opposite phase relation to the phase of the alternating signal which excites vibrator 113.

The signal generated by secondary 108 is supplied, as described, by lead 25 to the amplifier-filter unit 26. This unit includes three resistor-capacitor coupled triodes 120, 121, 122 connected as conventional amplifier stages together with a fourth triode 123. Triode 123 is also connected as a conventional amplifier stage except that the anode load therefor takes the form of a coupling transformer 124, the primary 125 of which is interposed between an anode voltage supply 126 and the anode 127 of triode 123, and the secondary 128 of which transformer is coupled to the input terminals of a filter 129. Filter 129, while rejecting undesired components, impresses the alternating signal component whose phase is of interest upon leads 27, 28 through a coupling transformer 130.

It will be seen that by the conversion of a small order difference in amplitude into a time characteristic of an alternating signal, such as phase, that a greatly amplified representation of the original small order phenomenon may be obtained without introducing in the result one or more large errors stemming from variations in the operating parameters of parts of the system as, say, the gain factor in the amplifier.

*The discriminator unit*

The discriminator unit 29 shown in Fig. 3 is fully disclosed in U. S. patent application, Serial No. 317,197, now U.S. Patent No. 2,850,240 filed in the name of A. H. Dickinson on October 28, 1952. Consequently, only a brief description of its circuit organization and operation is given herein. Referring to the figure, an alternating signal derived from source 13 (Fig. 1) via conduits 14, 15 and leads 30, 31 excites the primary winding 140 of a transformer 141 having a secondary winding 142. Winding 142 at one end is connected to two similar resistors 143, 144 forming respective anode loads for similar triodes 145, 146 having commonly coupled cathodes 147, 148. Winding 142 at the other end is connected to a junction 149 which in turn is coupled through a resistor 150 and a suitable static bias source 151 to the commonly coupled cathodes 147, 147. Winding 142 thus furnishes an alternating plate voltage for triodes 145, 146 which triodes, however, because of their rectifying nature, can only conduct during that half cycle when their cathodes are below their anodes in potential.

The alternating signal adapted to reverse in phase responsive to a null traversal in the difference between the measured and the measuring potentials is supplied to discriminator unit 29 by leads 27, 28. This signal excites the primary 155 of a transformer 156 having a secondary winding 157, the center of which is connected to junction point 149 and the ends of which are respectively connected to the grids 158 and 159 of triodes 145 and 146. The alternating voltage induced in secondary 157 is of the same frequency as the alternating plate voltage supplied triodes 145, 146. Thus, it will be seen that during the half cycle when triode conduction is possible, the grid of one triode will have a relatively high bias to cause conduction thereof, and the grid of the other triode will have a relatively low bias to prevent conduction thereof. Moreover, phase reversal of the alternating grid voltage supplied to both triodes will occasion a reversal of the triode selected for conduction. Triodes 145 and 146, together with the components associated therewith, thus form a polarized rectifier circuit 160.

In the present instance, it will be assumed that, when the alternating signal supplied to transformer 156 has its original or reference phase, triode 146 does not conduct at all, whereas triode 145 as shown by its shaded interior conducts every half cycle.

A capacitor 164 is connected between the anodes 165 and 166 of triodes 145 and 146. When triode 145 conducts, as described, during a portion of its plate voltage cycle, the effect thereof is to charge capacitor 164. During the non-conductive portion of the cycle, capacitor 164 discharges through resistors 144 and 143 to produce a voltage rise and a voltage drop, respectively, at the anodes 166 and 165. This voltage rise and drop are supplied, respectively, to the respective grids 167, 168 of two D.C. amplifier triodes 169 and 170 (both statically biased to be slightly conducting) to render the former more conductive (as shown by the shaded interior thereof) and the latter less conductive. In consequence, just after the start of a measuring cycle, triodes 169 and 170 will produce respective low and high anode voltages, which voltages are supplied respectively to the respective grids 171 and 172 of triodes 173 and 174 (both statically biased just below cut-off) to render the former triode non-conductive and the latter triode conductive, as shown in Fig. 3.

Right-hand triode 173 and left-hand triode 174 are keying devices for respectively the right-hand triode section 180 and the left-hand triode section 181 of a conventional bi-stable multivibrator circuit 182, this circuit being more fully described in sec. 5.4, vol. 19, M.I.T. Radiation Series. Keyer tubes 173, 174 bear such operative relationships to their associated multivibrator triode sections that a positive signal on the grid of a keyer tube induces a non-conduction of the triode section keyed thereby. Thus it will be seen that at the start of a measuring cycle, negative and positive grid signals being then, as described, supplied, respectively, to keyer tubes 173 and 174, multivibrator 182 will be either keyed to or will continue to remain in the state shown in Fig. 3 wherein triode sections 181 and 180 are respectively conducting and non-conducting. For convenience, the multivibrator state just described and the converse multivibrator state may be referred to, respectively, as the pre-detection and the post-detection state.

As described in connection with Fig. 1, eventually the measuring potential builds to a value whereby the addition of one mere unit causes this potential to exceed in magnitude the potential to be measured. In such case the phase of the signal induced in secondary winding 157 (Fig. 3) will be reversed. As a consequence, triode 146 now undergoes half-cycle conduction to supply a negative grid signal to triode 169, which in turn supplies a positive grid signal to keyer triode 173. In response, keyer triode 173 cuts off conduction in multivibrator section 181. Multivibrator 182, accordingly, transposes to its post-detection state wherein triode section 180 is rendered conducting and triode section 181 non-conducting.

When triode section 181 is rendered non-conducting, the junction 184 (between the anode 185 of the triode section and an anode resistor 186 therefor) exhibits a positive going voltage, which is supplied via a differentiating circuit, including capacitor 187 and resistor 188, to the grid 189 of a triode 190 connected as a normally cut-off amplifier. Responsively, triode 190 conducts to provide a negative trigger pulse on lead 35 coupled to the anode 191 of the triode.

*The control circuits and the register driving system*

Referring now to Fig. 4, the counter circuits unit 36 includes therein a conventional bi-stable multivibrator circuit 200 (similar to multivibrator 182) having left-hand and right-hand triode sections 201, 202 with grids 203, 204, said sections being respectively in a condition of non-conduction and conduction at the start of a measuring cycle. While multivibrator 200 is in this "pre-trigger" state, the relatively positive potential maintained on the grid 204 of triode section 202 is supplied by lead 60 to the suppressor grid 205 of a pentode 206 constituting the major component of gate circuit 51. By this relatively high suppressor grid potential, pentode 206 is maintained conductive to permit passage therethrough of pulses developed in the manner to be described.

For pulse development purposes, the alternating signal from source 13 (Fig. 1) is supplied by way of conduits 14, 15 and leads 40 and 41 to the input of a pulse generator unit 42. Referring to the more detailed showing of this unit in Fig. 4, pulse generator 42 comprises essentially the conventional organization of left-hand and right-hand triode sections 207, 208 forming a bi-stable multivibrator 210, and a pair of keyer tubes 211, 212, the mentioned organization being similar to multivibrator 182 and keyer triodes 173, 174 (Fig. 3). The alternating signal on leads 40, 41 is supplied in phase opposition to the respective grids 213, 214 of the two keyer tubes 211, 212 through the agency of a coupling transformer 215. Accordingly, multivibrator 210 will be driven in synchronism with the alternating signal to undergo one full cycle for each alternating signal cycle. In the course of operation, multivibrator 210 produces upon lead 43 (connected to the center of a resistor 216 forming an anode load for multivibrator section 208) one negative pulse for each full cycle undergone by the multivibrator. Since multivibrator 210 is continuously driven it accordingly generates a train of negative pulses as an output.

The train of negative pulses so produced on lead 43 is supplied to the first of $f/2$ stage 45 of timer 44 which, preferably, is a twelve-stage, scale-of-two type, pulse counter. In detail as shown in Fig. 4, the $f/2$ stage comprises a negative pulse sensitive bi-stable multivibrator 220 having the usual pair of triode sections 221, 222, together with respective anode resistors 223 and 224. Lead 43 is capacitor coupled to the grids 225, 226 of both mentioned triode sections, each negative pulse on lead 43 causing a transposition of conduction conditions between the two triode sections so that for each two negative pulses, multivibrator 220 undergoes two transpositions or one full transposition cycle. For each transposition cycle, one positive pulse and one negative pulse is produced on a lead 227 connected to the center of anode resistor 224. Lead 227, in turn, supplies the negative pulses produced thereon to drive the next or $f/4$ stage (not shown) of timer 44, this next stage and the stages following being similar in circuit organization and mode of operation with the $f/2$ stage 45 just described. It will be recognized that the $f/2$ stage 45 for each two negative input pulses yields one negative output pulse.

The positive and negative pulses developed on lead 227 are tapped off by lead 50 to be supplied to the control grid 230 of gate pentode 206. Pentode 206 is statically maintained below cut-off by an appropriate negative bias supplied to control grid 230 by a grid resistor 231 connected to a negative voltage supply 232. Hence, negative pulses reaching control grid 230 are of no effect. So long as pentode 206 is rendered capable of conduction, however, by a relatively positive bias supplied to its suppressor grid 205 by lead 60 from multivibrator 200, the positive pulses appearing on the control grid 230 will be transferred through pentode 206 to appear as negative pulses on lead 52 connected to the anode 233 of the pentode. These negative pulses so developed are supplied by the aforementioned lead to the input of register 18 (Fig. 5).

As described, at the start of a measuring cycle multivibrator 200 subsists in its pre-trigger state to thereby supply to the suppressor grid 205 of pentode 306 the relatively positive potential rendering the tube capable of conduction. Gating amplifier pentode 206, hence, is maintained in an "open" condition for signal passage therethrough of input pulses to register 18. This pre-trigger state is terminated, however, when in the comparer-modifier unit 12 the measuring potential exceeds the potential to be measured, causing discriminator unit 29 to supply, via lead 35, a negative trigger pulse to the grid 204 of right-hand triode section 202 of the multivibrator. This negative trigger pulse cuts off the conduction of the hitherto conducting right-hand triode section 202 to thereby induce a transposition of conduction conditions between triode section 202 and triode section 201. By this transposition, multivibrator 200 changes over to its post-trigger state for the duration of which a relatively negative potential is supplied via lead 60 to the suppressor grid 205 of gating pentode 206. Pentode 206 by this negative suppressor grid voltage, is rendered insusceptible to conduction with the result that the gate 51 is "closed"

to cut off the flow of pulses passing therethrough to the input of register 18.

*The register buffer amplifier array and translator units*

Referring now to Fig. 5, the figure shows in more detail than Fig. 1 the register unit 18, the buffer amplifier array 19, and the translator unit 20. Since, with the exceptions mentioned, these units are fully described in, respectively, U.S. patent, No. 2,584,811, issued February 5, 1952, to B. E. Phelps; U.S. patent application, No. 270,412, filed February 7, 1952, in the name of R. C. Paulsen; and U.S. patent application, No. 228,432, now U.S. Patent No. 2,717,994 filed May 26, 1951, in the name of A. H. Dickinson and R. C. Paulsen, the present description will be limited to a consideration of those features necessary to an understanding of the present invention.

Register 18 in essence comprises an electronic counter for manifesting each decimal digit of a four order decimal number in terms of a set of four binary digits. Register 18 thus includes four electron tube banks 240, 241, 242, 243 representing, respectively, the "units," "tens," "hundreds" and "thousands" decimal digit of a four order decimal number, the respective electron tube banks being signal coupled to provide a carry-over feature from one bank to that next highest in order. Each electron tube bank in turn includes a blocking tube (not shown) and four binary stages as, for example, the stages 251, 252, 253, and 254 of electron tube bank 240, the several binary stages in each bank thereof representing "zero" value when in a state which may be typified as "off" and representing the value shown in Fig. 5 when in a state which may be typified as "on." For example, stages 251, 252, 253 and 254 of electron tube bank 240 when "on" represent, respectively, the values $1u$, $2u$, $4u$ and $8u$ where $u$ is the module as, for example, microvolts, employed in expressing the unknown potential measured in accordance with the present invention.

Each of the mentioned binary stages comprises essentially a negative pulse sensitive, bi-stable multivibrator as, for example, in stage 251 the multivibrator 260 which for the shown "off" state has a non-conducting left-hand triode section 261 and a conducting right-hand triode section 262, together with a left-hand and right-hand resistors 263 and 264 for the respective triode sections. Moreover, in each binary stage the anode of the right-hand multivibrator triode section is coupled, through a current limiting resistor and a neon indicating tube in series, to the lead 61 common to all stages, and the center point of the right-hand multivibrator anode resistor is joined to a lead supplying a negative pulse as an output of the given stage to the input of the stage of next higher value. For example, in binary stage 251 the anode 266 of right-hand triode section 262 is coupled through current limiting resistors 267 and neon indicating tube 268 to lead 61 while the center point of anode resistor 264 is joined to lead 269 connected at its other end (not shown) to the input of stage 252.

In operation, register 18 is driven by the negative pulses supplied by lead 52 to the input of stage 251. At the start of a measuring cycle each binary stage is in an "off" state corresponding to the condition shown in Fig. 5 for multivibrator 260. Responsive to the first negative pulse (and each odd pulse thereafter) on lead 51, multivibrator 260 changes from its "off" to its "on" state, while responsive to the second received negative pulse (and each even pulse thereafter) multivibrator 260 changes from its "on" to its "off" state. As is conventional, stage 252 undergoes one change in state for each two changes of state for multivibrator 260 in stage 251. The other stages of register 18 are similarly driven.

As shown in Fig. 5, the buffer amplifier array 19 comprises a plurality of buffer amplifier sections respectively corresponding with the binary stages of register 18.

For illustrative purposes there is shown in detail the circuit organization of buffer amplifier section 271 corresponding with the first stage 251 of the register. Considering the interrelation between stage 251 and buffer section 271, the lead 53 joins the grid 272 of triode section 261 in multivibrator 260 to the grid 273 of an amplifier connected triode 274 in the buffer section 271. When multivibrator 260 is in its initial "off" state, the negative voltage on grid 272 is imparted to grid 273 of triode 274. Triode 274 accordingly, develops at its anode 275 a positive voltage which is impressed across resistors 277 and 278, serially connected between anode 275 and a negative potential supply 276. A positive potential thus appears at the junction point 279 of resistors 277 and 278, a diode 280 being connected with appropriate polarity between this junction point and ground to prevent voltage rises much above ground at the junction point. Junction point 279, in turn, supplies this relatively positive potential to lead 54 connected thereto.

When multivibrator 260 of stage 251, responsive to a pulse on lead 52, assumes an "on" state, the positive going voltage appearing at the grid 272 of triode section 261 is transmitted by lead 53 to the grid 273 of triode 274 to cause a negative going voltage to appear at the triode anode 275, to, hence, cause a negative voltage to be supplied to lead 54. Each of the binary stages of register 18 upon assuming an "on" state, causes the buffer amplifier section associated therewith to provide a similar negative output signal.

As shown in Fig. 5, the translator unit 20, proper, comprises a supply 285 of a positive potential of precisely predetermined value, a set of resistors 286–301, inclusive, connected in series relation between supply 285 and a junction point 302, and a set of translator stages respectively coupled between ground and that end of each of the mentioned resistors which is away from the source 285. There is one translator stage for each buffer amplifier section. The several translator stages are substantially identical, the translator stage 311 corresponding with binary amplifier section 271 being exemplary. Considering the details of this last-mentioned translator stage, there is included therein a normally conducting, constant current pentode 312 having a control grid 313 connected to lead 54 and a cathode 314 connected to ground through a fixed resistor 315 and a variable resistor 316 permitting adjustment of the current flow through the pentode.

At the start of a measuring cycle, when, for example, lead 54 supplies ground potential to the control grid 313 of pentode 312, the translator stage 311, and the other translator stages as well, will be current conductive to provide the maximum voltage drop from supply 285 through the set of series connected resistors 286–301, inclusive. Junction point 302 will thus be at a minimum value with respect to ground. Whenever a binary stage of register 18, however, assumes an "on" state to cause its corresponding buffer amplifier section to yield a negative output signal, current conduction through the translator stage associated with the actuated buffer amplifier section will be cut off. For example, current flow through translator stage 311 will be interrupted by the negative signal on lead 54 supplied to the control grid 313 of pentode 312.

The amount of current conduction through the several translator stages, the distribution of resistor values between the resistors 286–301, inclusive, and the predetermined value of the potential at supply 285 is such that when current flow is interrupted through a particular translator stage the voltage at junction point 302 will increase by the number of units of measure assigned to the corresponding binary stage of register 18 when this stage is in the "on" state. For example, if the unit of measure is the microvolt, and if stage 251 representing one microvolt is "on," pentode 312 in translator stage 311 will be cut off to increase the voltage at junction 302 by one microvolt. Similarly, if binary stages 252 and 253 having respectively the assigned values of 2 and 4 microvolts are both "on," the appropriate translator stages will be energized to increase the voltage at junction point 302 by 2 plus 4 or 6 microvolts.

In addition to the components hitherto described and in distinction from the translator unit as disclosed in the aforementioned U.S. Patent No. 2,717,994, in accordance with the present invention the translator unit 20 includes as another component a continuously conducting constant current pentode 315 having an anode 316 connected by resistor 317 to junction point 302 and having a cathode 318 connected through the variable resistor 319 to a suitable source of negative potential 320. The anode 316 of pentode 315 is connected at junction point 321 to the lead 21 which supplies the measuring potential to the comparer-modifier 12 (Fig. 1).

In a pre-measurement calibration adjustment, the variable resistor 319 is adjusted to regulate the current flow through pentode 315 to such value that when register 18 in decimal terms reads "0000" to render all translator stages conducting, the magnitude of the voltage at junction point 321 will be one unit of measure (e.g., one microvolt) above ground. This extra unit of measure is continuously carried as the measuring potential builds up responsive to the progressively increasing registry of register 18. Hence, at all times the magnitude of the measuring potential expressed in the units of measure employed is one greater in numerical value than the count manifested by the register. This operational feature is a feature of specific utility in that it results in an overt registration of "zero" value by the counter means when the claimed system is set into operation, but when the electrical quantity to be measured is zero. Absent this feature, the counter means would provide an overt (and incorrect) reading of "1" in situations where the electrical quantity to be measured has zero value.

*Measuring operation*

To summarize the operation of the presently disclosed embodiment of the invention as so far described, at the start of a measuring cycle register 18 is set in decimal terms at "0000," the translator 20 supplies a measuring potential of one microvolt to the comparer-modifier 12 and the gate 51 is open to permit input pulses to be supplied to register 18. Responsive to reception of these impulses, register 18 accumulates a count causing translator 20 to commensurately increase its measuring potential output, the value of the measuring potential being always one unit greater than the accumulated count registry on the register. When the measuring potential supplied to comparer-modifier 12 exceeds the potential to be measured, also supplied to the comparer-modifier, a trigger signal will be developed by discriminator unit 29 causing gate circuit 51 to be closed. The flow of input pulses to register 18 will accordingly, be cut off with the result that the count accumulation of the register will cease at a registry manifesting, in terms of binary representations of decimal digits, the numerical value of the potential measured by the system.

*Indication, reset, overload*

Referring again to Fig. 4, it will be recalled that from the start of a measuring cycle to the time a trigger pulse is received on lead 35, the multivibrator 200 subsists, as described, in a pre-trigger state wherein left-hand triode section 201 is non-conductive and right-hand triode section 202 conductive. Under these conditions the negatively maintained voltage on the grid 203 of triode section 201 is supplied by a lead 330 to the grid 331 of a triode 332. Triode 332 is interposed between lead 61, commonly coupled with all the neon indicating tubes for register 18 (Fig. 5), and a return path 333 for current flowing through these neon tubes. The negative voltage supplied, as described, to the grid 331 is sufficient to cut off triode 332 with the result that all of the neon tubes are blanked out. When, however, multivibrator 200, responsive to the negative trigger pulse on lead 35, switches to its post-trigger state wherein triode section 201 is conducting, the positive voltage appearing on grid 203 is transmitted to the grid 331 permitting triode 332 to draw current. As a result, such of the neon tubes as are connected to "on" binary stages of register 18, will conduct current to yield by their glow a visual manifestation of the static accumulated count of the register. It will be seen, accordingly, that the indicating function of register 18 is postponed in a measuring cycle until such time as the register count has been completed for the cycle.

Referring again to the timer 44 (Fig. 4), it will be recalled that this unit comprises a chain of 12, negative pulse sensitive, bi-stable multivibrator stages so coupled that the multivibrator of any stage reverses state once for each two reversals of the previous stage. It will also be recalled that output lead 227 for the first or f/2 stage 45 exhibits alternate positive and negative signals thereon, the succeeding stage, however, being triggered only upon initiation of the negative going signals. While each of the stages of timer 44 are similar to the f/2 stage 45 thereof in circuitry and in type of output signal, for clarity only the f/2 stage 45, the output lead 340 for the f/2048 stage 46 and the f/4096 stage 47 are shown in schematic detail, the other stages of timer 44 being omitted as indicated by the area between dotted lines 341 and 342.

With 2048 input pulses to timer 44 the multivibrator 350 of the f/4096 stage 47 switches from the "off" state shown in Fig. 4 to an "on" state wherein the left-hand triode section 351 thereof is non-conducting, and the right-hand triode section 352 thereof is conducting. Hence, at this half-way mark in a measuring cycle, the grid 354 of right-hand triode section 507 will be driven positive to supply, via lead 65, a positive voltage to the control grid 355 of a pentode 356 connected as a coincidence tube. It will also be appreciated that at the three-quarter mark in the measuring cycle the f/2048 stage 46 develops on its output lead 340 a positive signal which is transmitted by the lead 66 to the suppressor grid 357 of the aforementioned pentode 356.

Responsive to the simultaneous appearance of positive potentials on both its control and its suppressor grid, pentode 356 at the three-quarter mark of the measuring cycle will conduct to develop a negative pulse at the anode 358 thereof. This negative pulse is transmitted by a capacitor 359 to the control grid 360 of a triode 361 connected as a conventional amplifier. Triode 361 thereby develops a corresponding positive pulse at its anode 362. This positive pulse is supplied by the lead 67 to the control grid 365 of a triode 366 (Fig. 5) connected as a conventional cathode follower. The resultant positive output signal from cathode follower 366 resets all of the binary stages of register 18 to "off" in the manner shown for binary stage 251 wherein the positive output signal is supplied by leads 370 and 371 through a resetting diode 372 and, thence, by lead 373 to grid 374 of right-hand triode section 261 for multivibrator 260. If, for the stabilized accumulated count of register 18 multivibrator 260 has been "on" so that triode section 261 has been non-conducting, the positive signal impressed on grid 374 causes triode section 261 to reconduct to thereby restore the multivibrator to the "off" state. Hence, at the three-quarter mark in a measuring cycle, the register 18 will be reset to a decimal reading of "0000," the collateral effect following that all of the neon indicating tubes for the register will be blanked out.

As stated, upon reaching the half-way mark of a measuring cycle, multivibrator 350 in the f/4096 stage 47 of timer 44 (Fig. 4) will reverse conduction conditions from that shown in Fig. 4 so that after the half-way mark, left-hand and right-hand triode sections 351 and 352 respectively become non-conducting and conducting. At the end of a measuring cycle, however (4096 input pulses having been received by timer 44), multivibrator 350 reverts to the original state shown in Fig. 4 wherein triode sections 351 and 352 are restored to their original respective conducting and non-conducting conditions. Under these circumstances a negative going signal front of a negative voltage drop, developed at the center point 380 of anode resistor 381 for triode section 351, is transmitted by lead 70 to the grid 203 of left-hand section 201 of multivibrator 200, the multivibrator 200 at this time being in its post-trigger state wherein conduction conditions for its triode sections are transposed from those shown in Fig. 4. Responsive to reception of this negative going signal front, multivibrator 200 undergoes another transposition to be restored to its original pre-trigger state wherein, as shown in Fig. 4, triode section 201 is non-conducting and triode section 202 conducting.

When triode section 202 is once again rendered conducting, a negative going signal front of a negative voltage drop, developed at the center point 382 of anode resistor 383 for the triode section 202, is supplied by lead 71 back to the grid 385 of left-hand section 180 for multivibrator 182 within discriminator unit 29 (Fig. 3). Multivibrator 182, it will be recalled, responsive to the measuring potential exceeding in the comparer-modifier unit 12 (Fig. 1) the potential to be measured, has, earlier in the measuring cycle, undergone a transposition to have opposite triode section conduction conditions from that shown in Fig. 3. Responsive, however, to the negative going signal front supplied by lead 71, multivibrator 182 undergoes another transposition to return to its original state wherein triode section 180 is non-conducting and triode section 181 is conducting.

At the end of a measuring cycle, therefore, both the discriminator unit 29 (Fig. 3) and the multivibrator 200 in the control circuits unit 36 (Fig. 4) have been restored to the state compatible with the start of a new measuring cycle. It will be recalled that at the three-quarter mark of the considered measuring cycle, register 18 and translator unit 20 were similarly restored. Thus, the measuring system is, as a whole, prepared to undertake a new measuring cycle.

The new measuring cycle is automatically initiated by restoration, as described, of multivibrator 200 to its pre-trigger state so that multivibrator, via lead 60, once again supplies a positive potential to suppressor grid 205 of pentode 206 in gate circuit 51 (Fig. 4). Gate circuit 51, accordingly, opens to permit passage therethrough of driving pulses from timer 44 to register 18. Hence, it will be seen that the measuring system of the present invention automatically undergoes a series of measuring cycles.

The measuring system presently described is adapted to measure potential having at the most a magnitude in the neighborhood of 1000 units of the module employed, potentials exceeding this value, being apt to produce error in measurement. To safeguard against unknown potentials exceeding in magnitude this predetermined permissible measurement level, in accordance with the present invention there is provided an overvoltage feature described below.

When multivibrator 200 (Fig. 4) is in its pre-trigger state, as shown in Fig. 4, the multivibrator develops, as described, a positive potential upon grid 204 of triode section 202. This positive potential is supplied by lead 390 to the first control grid 391 of a thyratron 392 capable of being fired only upon coincidence of a positive voltage on both the mentioned first control grid and upon a second control grid 393 for the thyratron. It will also be recalled that at the half-way mark in a measuring cycle, the f/4096 stage 47 of timer 44 supplies a positive potential to lead 70. This positive potential is tapped off lead 70 by a lead 394, capacitor 395 and lead 396 to be supplied to the second control grid 393 of thyratron 392.

If the unknown potential to be measured supplied to comparer-modifier unit 12 (Fig. 1) is less than 1024 units, the measuring potential, also supplied to this unit, will reach the actual value of the unknown potential prior to the measuring cycle half-way mark, the result following, as described, that multivibrator 200 responsive to a negative trigger pulse from lead 35, is switched from its pre-trigger to its post-trigger state. Hence, thyratron 392 cannot be fired since before the half-way mark a negative potential, continuing for the rest of the cycle, will be supplied, via lead 390, to the first control grid 391 of the thyratron. If, on the other hand, the potential to be measured exceeds 1024 units of measure, the accumulated count on register 18 of "1024" is insufficient to generate through translator 20 a measuring potential which will traverse a null in the difference between the two potentials. Hence, at the half-way mark no negative pulse will as yet have been produced by discriminator unit 29 for triggering the multivibrator 200.

In the overvoltage case, accordingly, at the half-way mark a positive potential continues to be supplied from multivibrator 200 via lead 390 to the first control grid of thyratron 392, and concurrently a positive potential is, for the first time, supplied from the f/4096 stage 47 of the timer 44 to the second control grid 393 of thyratron 392. Conjointly responsive to those two positive potentials, the thyratron is fired to draw current through the series combination of relay coil 400 and single-pole, single-throw switch 401 interposed between the anode 402 of thyratron 392 and a supply 403 of anode voltage therefor.

Relay coil 400, when energized by current passage therethrough, closes a first set of contacts 404 (upper right of Fig. 4) to complete a circuit through neon indicating tube 405 which, by its glow, thereupon indicates an overvoltage for the unknown potential applied to the input of comparer-modifier 12. Additionally, relay coil 400 when energized, closes a second set of contacts 406 (upper right of Fig. 4) to couple the grid 360 of counter reset triode 361 to ground, the counter reset triode thereby developing a positive going anode signal, which in the manner previously described, produces resetting of all the stages for register 18. Moreover, energization of relay coil 400 closes a third set of contacts 407 (lower left of Fig. 4) to shunt the anode 233 of gating pentode 206 to ground to thereby prevent passage of register driving pulses through the pentode. Thus, if an overvoltage exists for the potential measured by the presently described system, the register 18 is prevented from accumulating a count of more than 1024 units and is further prevented from manifesting the accumulated count by its array of neon tubes.

When an overvoltage has been detected in the manner described, to restore the measuring system to proper operating condition, it is necessary only to remove the overvoltage measuring potential from the input of comparer-modifier 12 and to then first open and then close single-pole, single-throw switch 401. Opening of the switch extinguishes overvoltage thyratron 392, while re-closure of the switch renders the thyratron 392 again capable of detecting an overvoltage.

While there have been shown and described and pointed out the novel features of the invention as applied to a preferred embodiment, it will be understood that various omissions and substitutions and changes in the form and details of the device illustrated, and in its operation, may be made by those skilled in the art, without departing from the spirit of the invention. For example, the described measuring system may be modified to measure in microamperes the value of an unknown quantity manifesting itself in terms of current by connecting a standard one ohm resistor between ground and the unknown quantity input to comparer-modifier 12. Units of measure other than microvolts or microamperes may be employed. By increasing the number of stages of the timer 44, register 18, the buffer amplifier array 19, and the translator unit 20, the permissible upper limit of measurement for the magnitude of the unknown quantity to be measured may be correspondingly increased to any desired value. Moreover, within the ambit of the invention, the presently described system may be modified so that the register has a subtractive action and the measuring potential from an initial value larger than the potential measured, progressively decreases. It is the intention, therefore, to be limited only as indicated by the scope of the following claims.

I claim:

1. In a measuring system having a terminal adapted to receive a potential to be measured, a source of pulses, counter means of the pulses developed by said source, and a translator circuit connected with said counter to develop at an output for said circuit a potential progressively changing by equal increments responsive to a progressively changing registry of pulses received by said pulse counter means, the combination therewith of a comparer device including two fixed contacts, a movable contact closable with each of said fixed contacts one at a time, and transformer means having a secondary and a center tapped primary coupled between said two fixed contacts, said movable contact and the center tap of said primary being end connections for said comparer device, vibrator means adapted when excited by an alternating signal to correspondingly operate said movable contact to make alternate closures with said two fixed contacts, means connecting said comparer device by the end connections thereof in circuit between said terminal and said output, alternating signal amplifier means for providing an amplification of the signal induced in the secondary of said transformer means by the alternate closures of said movable contact with said fixed contacts, and a phase-responsive control circuit adapted by comparing in phase said alternating signal with the output signal of said amplifier means to terminate the flow of pulses from said source to said pulse counter means upon occurrence of a phase reversal in said amplifier output signal.

2. In a measuring system having a terminal adapted to receive potential to be measured, a source of pulses, counter means of the pulses developed by said source, gate means interposed in circuit between said source and said counter means to gate the flow of pulses from the former to the latter, and a translator circuit connected with said counter means to develop at an output for said circuit a potential progressively changing by equal increments responsive to a progressively changing registry of pulses passing through gate means to be received by said pulse counter means, the combination therewith of a comparer device including two fixed contacts, a movable contact closable with each of said fixed contacts one at a time, and transformer means having a secondary and a center tapped primary coupled between said two fixed contacts, said movable contact and the center tap of said primary being end connections for said comparer device, vibrator means adapted when excited by an alternating signal to correspondingly drive said movable contact to make alternate closures with said two fixed contacts, means connecting said comparer device by the end connections thereof in circuit between said terminal and said output, alternating signal amplifier means for providing an amplification of the signal induced on the secondary of said transformer means by the alternate closures of said movable contact with said fixed contacts, polarized rectifier means adapted by comparing inputs of said alternating signal and the output signal from said amplifier means to reverse the polarity of an output signal from said rectifier means in response to a phase reversal of said amplifier output signal, and multivibrator means adapted responsive to said polarity reversal to change its state, said change in state providing a signal closing said gate means with respect to pulses passing therethrough.

3. In a measuring system having a terminal adapted to receive an electrical quantity to be measured, counter means of pulses furnished thereto, gate means for controlling the flow of pulses to said counter means, and a translator circuit connected with said counter means to develop at an output for said circuit an electrical quantity progressively changing by increments responsive to a progressively changing registry of pulses received by said pulse counter means after passage of said pulses through said gate means, said system further including control means responsive to a traversal of zero value in the difference between said quantity at said terminal and said quantity at said output for closing said gate means, the combination therewith of, a timing unit drivable by input pulses, said unit including a plurality of bistable stages connected in cascade relation as a pulse counter characterized by frequency division from stage to stage so that said stages are driven to cycle in change of state at sub-frequencies of the input pulse rate to said unit, means for supplying in synchronism input pulses to said unit and pulses to said gate means for driving said counter means when said gate means is opened, means responsive to a change of state of at least one of said stages for resetting said pulse counter means to the initial value thereof for a measuring cycle, and means responsive to a change in state of at least one of said stages for causing said control means by reopening said gate means to initiate another measuring cycle, said initiation occurring when said timing unit itself has undergone a full pulse counting cycle.

4. In a measuring system having a terminal adapted to receive an electrical quantity to be measured counter means of pulses furnished thereto, gate means for controlling the flow of pulses to said counter means, and a translator circuit connected with said counter means to develop at an output for said circuit an electrical quantity progressively changing by increments responsive to a progressively changing registry of pulses received by said pulse counter means after passage of said pulses through said gate means, said system further including control means responsive to a traversal of zero value in the difference between said quantity at said terminal and said quantity at said output for closing said gate means, the combination therewith of, a timing unit drivable by input pulses, said unit including a plurality of bistable stages connected in cascade relation as a pulse counter characterized by frequency division from stage to stage so that said stages are driven to cycle in change of state at sub-frequencies of the input pulse rate to said unit, means for supplying input pulses to said unit, means responsive to changes in state of a said stage with a first cycling sub-frequency for providing pulses to said gate means to drive said counter means when said gate means is opened, coincidence means responsive conjointly to a change in state of a stage with a cycling sub-frequency which is intermediate said first and the lowest cycling sub-frequency and to a change in state of the stage of lowest cycling sub-frequency for resetting said counter means to the initial value thereof for a measuring cycle, said resetting occurring after a period compatible with attainment by said changing quantity of a specified measurement level, and means responsive to a change in state of the lowest cycling sub-frequency stage for causing said control means by reopening said gate means to initiate another measuring cycle, said initiation occurring when said timing unit itself has undergone a full pulse counting cycle.

5. In a measuring system having a terminal adapted to receive an electrical quantity to be measured, counter means of pulses furnished thereto, gate means for controlling the flow of pulses to said counter means, and a translator circuit connected with said counter means to develop at an output for said circuit an electrical quantity progressively changing by increments responsive to a progressively changing registry of pulses received by said pulse counter means after passage of said pulses through said gate means, said system further including control means responsive to traversal of zero value in the difference between said quantity at said terminal and said quantity at said output to change from a first to a second state to thereby close said gate means, the combination therewith of electric timing means controlled by the timing of said pulses from said source to be driven throughout a measuring cycle at a rate synchronous with that established for said pulse counter means during progressive registry thereof, said timing means providing a characteristic signal output after a period compatible with attainment by said changing quantity of a level corresponding with the limiting permissible measurement level for said quantity to be measured, and means conjointly responsive to said characteristic signal output and to concurrent continuance of said control means in said first state for closing said gate means and for resetting said counter means.

6. In a measuring system having a terminal adapted to receive an electrical quantity to be measured, counter means of pulses furnished thereto, gate means for controlling the flow of pulses to said counter means, and a translator circuit connected with said counter means to develop at an output for said circuit an electrical quantity progressively changing by increments responsive to a progressively changing registry of pulses received by said pulse counter means after passage of said pulses through said gate means, said system further including multivibrator control means providing a signal indicative of the state thereof, said multivibrator means responding to a traversal of zero value in the difference between said quantity at said terminal and said quantity at said output to change from a first to a second state to thereby close said gate means, the combination therewith of, a timing unit of the pulse counter type controlled by the timing of said pulses from said source to be driven at a rate synchronous with that established for said pulse counter means during registry thereof, said timing unit including a bi-stable stage which operates by a change in state thereof to provide an output signal after a period compatible with attainment by said changing quantity of a value corresponding with a limiting permissible measurement level for said quantity to be measured, and coincidence means conjointly responsive to said output signal and to a signal from said multivibrator indicative of concurrent continuance thereof in said first state for closing said gate means and for resetting said pulse counter means.

7. In a measuring system having a terminal adapted to receive an electrical quantity to be measured, a source of pulses, counter means of the pulses developed by said source, a translator circuit connected with said counter means to develop at an output for said circuit an electrical quantity progressively changing by increments responsive to a progressively changing registry by said counter means of the pulses received thereby, and a device connected in circuit between said terminal and said output to respond to the difference of said quantities by producing first and second different electric signals before and after there has been a change in sense of said difference, the combination therewith of an electric circuit controlled by the timing of said pulses from said source to progressively change in electrical condition, in timed relation with and as a measure of the change of said changing quantity towards, an end condition corresponding to a limiting permissible measurement level for said quantity to be measured, and to produce a third electric signal upon reaching said end condition, and coincidence means conjointly responsive to said first signal and to said third signal for resetting said counter means.

8. In a measuring system having a terminal adapted to receive a potential to be measured, a source of pulses, counter means of the pulses developed by said source, gate means interposed in circuit between said source and said counter means to gate the flow of pulses from the former to the latter, a translator circuit connected with said counter to develop at an output for said circuit an electrical quantity progressively changing by increments responsive to a progressively changing registry by said counter means of the pulses received thereby, and a device connected in circuit between said terminal and said output to respond to the difference of said quantities by producing first and second different electric signals before and after there has been a change in sense of said difference, the combination therewith of an electric circuit controlled by the timing of said pulses from said source to progressively change in electrical condition, in timed relation with and as a measure of the change of said changing quantity, towards an end condition corresponding to a limiting permissible measurement level for said quantity to be measured, and to produce a third electric signal upon reaching said end condition, and coincidence means conjointly responsive to said first signal and to said third signal for closing said gate means to thereby terminate the flow of pulses to said counter means.

References Cited in the file of this patent
UNITED STATES PATENTS

| | | |
|---|---|---|
| 2,366,618 | Harrison | Jan. 2, 1945 |
| 2,568,724 | Earp et al. | Sept. 25, 1951 |
| 2,761,968 | Kuder | Sept. 4, 1956 |